(12) United States Patent
Gelfand

(10) Patent No.: US 8,144,228 B2
(45) Date of Patent: Mar. 27, 2012

(54) IMAGE SENSOR HAVING A RAMP GENERATOR AND METHOD FOR CALIBRATING A RAMP SLOPE VALUE OF A RAMP SIGNAL

(75) Inventor: Vadim Gelfand, Ramat-Gan (IL)

(73) Assignee: Samsung Electronics, Co., Ltd., Gyeonggi-do (KR)

( * ) Notice: Subject to any disclaimer, the term of this patent is extended or adjusted under 35 U.S.C. 154(b) by 896 days.

(21) Appl. No.: 12/213,992

(22) Filed: Jun. 27, 2008

(65) Prior Publication Data
US 2009/0066826 A1 Mar. 12, 2009

Related U.S. Application Data

(60) Provisional application No. 60/946,641, filed on Jun. 27, 2007.

(51) Int. Cl.
H04N 5/335 (2011.01)
H01L 27/00 (2006.01)
H03M 1/56 (2006.01)

(52) U.S. Cl. ................ 348/308; 250/208.1; 341/169

(58) Field of Classification Search ............. 348/302, 348/308–310; 250/208.1; 341/166, 169, 341/170
See application file for complete search history.

(56) References Cited

U.S. PATENT DOCUMENTS
2007/0046802 A1* 3/2007 Ham et al. .............. 348/308
* cited by examiner Primary Examiner — Alicia M Harrington
(74) Attorney, Agent, or Firm — Harness, Dickey & Pierce, P.L.C.

(57) ABSTRACT

An apparatus and method for calibrating a ramp slope value of a ramp signal to increase the accuracy of the slope of the ramp signal used within CMOS image sensors. An image sensor includes an active pixel sensor (APS) array, a ramp signal generator and an analog-to-digital converter (ADC). The APS array is configured to generate a reset signal and an image signal for a pixel of a selected row of the APS array. The ramp signal generator is configured to generate a ramp signal, a ramp slope value of the ramp signal being adjusted based on a slope control signal. The ADC is configured to generate a digital code based on the ramp signal and a difference between the reset signal and the image signal.

20 Claims, 8 Drawing Sheets

Image Sensor

Analog Calibration Block though these terms may be used to describe various elements, these
IMAGE SENSOR HAVING A RAMP GENERATOR AND METHOD FOR CALIBRATING A RAMP SLOPE VALUE OF A RAMP SIGNAL

PRIORITY STATEMENT

This U.S. non-provisional patent application claims priority under 35 U.S.C. §119(e) to U.S. Provisional Application No. 60/946,641, filed on Jun. 27, 2007, the disclosure of which is incorporated herein in its entirety by reference.

BACKGROUND

1. Field

Example embodiments relate to image sensors having a ramp generator, for example, a ramp generator and method for calibrating a ramp slope value of a ramp signal.

2. Description of the Related Art

Conventional complementary metal-oxide semiconductor (CMOS) image sensors are commonly used in portable cameras, digital still cameras, and web cameras, for example, to convert an image into a digital signal. The conventional CMOS image sensor uses a correlated double sampling (CDS) method and a ramp signal to generate a digital signal. For example, the CMOS image sensor determines the difference between a reset signal and an image signal that varies based on external light illumination. The CMOS image sensor may generate a digital code corresponding to the difference between the reset signal and the image signal. The digital code may vary depending on the slope of the ramp signal. To maintain the same luminosity or brightness for different samples or different operating conditions of the same sample (including intentional clock rate change, for example), the ramp signal must be constant when the image is acquired by the CMOS image sensor.

Conventionally, an analog ramp calibration scheme may generate and calibrate a constant ramp signal. In the conventional analog scheme, the ramp signal may be adaptively calibrated to coincide with an analog target voltage using an analog comparator. The accuracy of the ramp calibration process may affect the accuracy of the ramp signal, which in turn, may affect image quality.

SUMMARY

Example embodiments provide image sensors, ramp generators and methods for calibrating ramp slope values of ramp signals to increase the accuracy of a linear slope of the ramp signals used within CMOS image sensors.

Example embodiments may provide an image sensor including an active pixel sensor (APS) array to generate a reset signal and an image signal for a pixel of a selected row of the APS array, a ramp signal generator configured to generate a ramp signal, a ramp slope value of the ramp signal being adjusted based on a slope control signal, and an analog-to-digital converter (ADC) configured to generate a digital code based on a difference between the reset signal and the image signal, the ramp signal.

According to example embodiments, the method for calibrating a ramp slope value of the ramp signal may include generating a first ramp signal corresponding to a first calibration cycle; generating a first and second calibration code based on the first ramp signal; generating a slope control signal based on the first and second calibration codes; and calibrating a ramp slope value of a second ramp signal corresponding to a second calibration cycle based on the slope control signal.

BRIEF DESCRIPTION OF THE DRAWINGS

Example embodiments will become more apparent by describing in detail the attached drawings in which.

DETAILED DESCRIPTION OF EXAMPLE EMBODIMENTS

Figure 1:
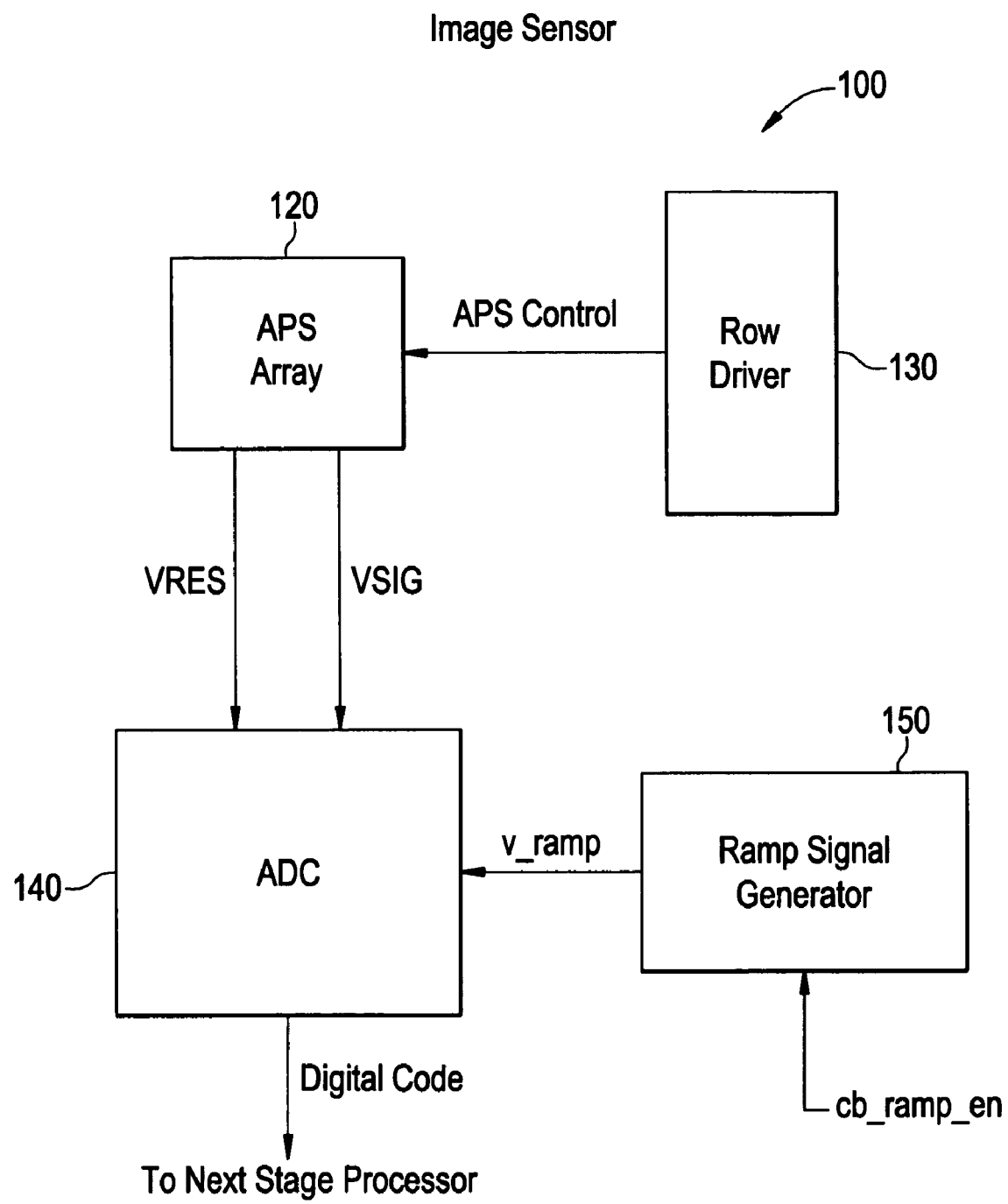
FIG. 1 is a block diagram of an image sensor according to example embodiments.

Detailed example embodiments are disclosed herein. However, specific structural and functional details disclosed herein are merely representative for purposes of describing example embodiments. Accordingly, example embodiments are capable of various modifications and alternative forms. It should be understood, however, that there is no intent to limit example embodiments to the particular forms disclosed, but on the contrary, example embodiments are to cover all modifications, equivalents, and alternatives falling within the scope of the application.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used here, the term "and/or" includes any and all combinations of one or more of the associated listed items.

The terminology used herein is for the purpose of describing particular embodiments only and is not intended to be limiting. As used here, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Example embodiments will now be described more fully with reference to the accompanying drawings. This invention, however, may be embodied in many different forms and should not be construed as limited to example embodiments set forth herein. Rather, example embodiments are provided so that this disclosure will be thorough and complete, and will fully convey the scope of the application to those skilled in the art. In the drawings, like numbers refer to like elements throughout.

FIG. 1 is a block diagram of an image sensor 100 according to example embodiments. Referring to FIG. 1, the image sensor 100 may include an active pixel sensor (APS) array 120, a row driver 130, an analog-to-digital converter (ADC) 140, and a ramp signal generator 150. The ADC 140 may include a correlated double sampling (CDS) circuit (not shown). The image sensor 100 may include a control unit (not shown), which generates overall timing control signals for the ramp signal generator 150 and the ADC 140.

According to example embodiments, the row driver 130 may receive a control signal from a row decoder (not shown). The row driver 130 may generate a row selection signal CONTROL and apply the generated row selection signal CONTROL to the APS array 120. The row selection signal CONTROL may be row APS controls. The APS array 120 may select pixels for sampling based on the row selection signal CONTROL from the row driver 130. For each selected pixel, the APS array 120 may output a reset signal VRES and an analog image signal VSIG to the ADC 140. The image signal VSIG may be indicative of an exposure level of the selected pixel.

The ADC 140 may convert the received analog image signal VSIG into a digital domain (or digital code) based on a difference between the reset signal VRES and the image signal VSIG using a ramp signal v_ramp according to a CDS scheme. The ADC 140 may output the generated digital code to a next stage processor such as an image signal processor (ISP). The ramp signal v_ramp may be generated by the ramp signal generator 150. In one example, the ramp signal generator 150 may generate a ramp signal v_ramp in response to an enable signal cb_ramp_en. The ramp signal generator 150 will be described in more detail below with regard to FIG. 2.

Figure 2:
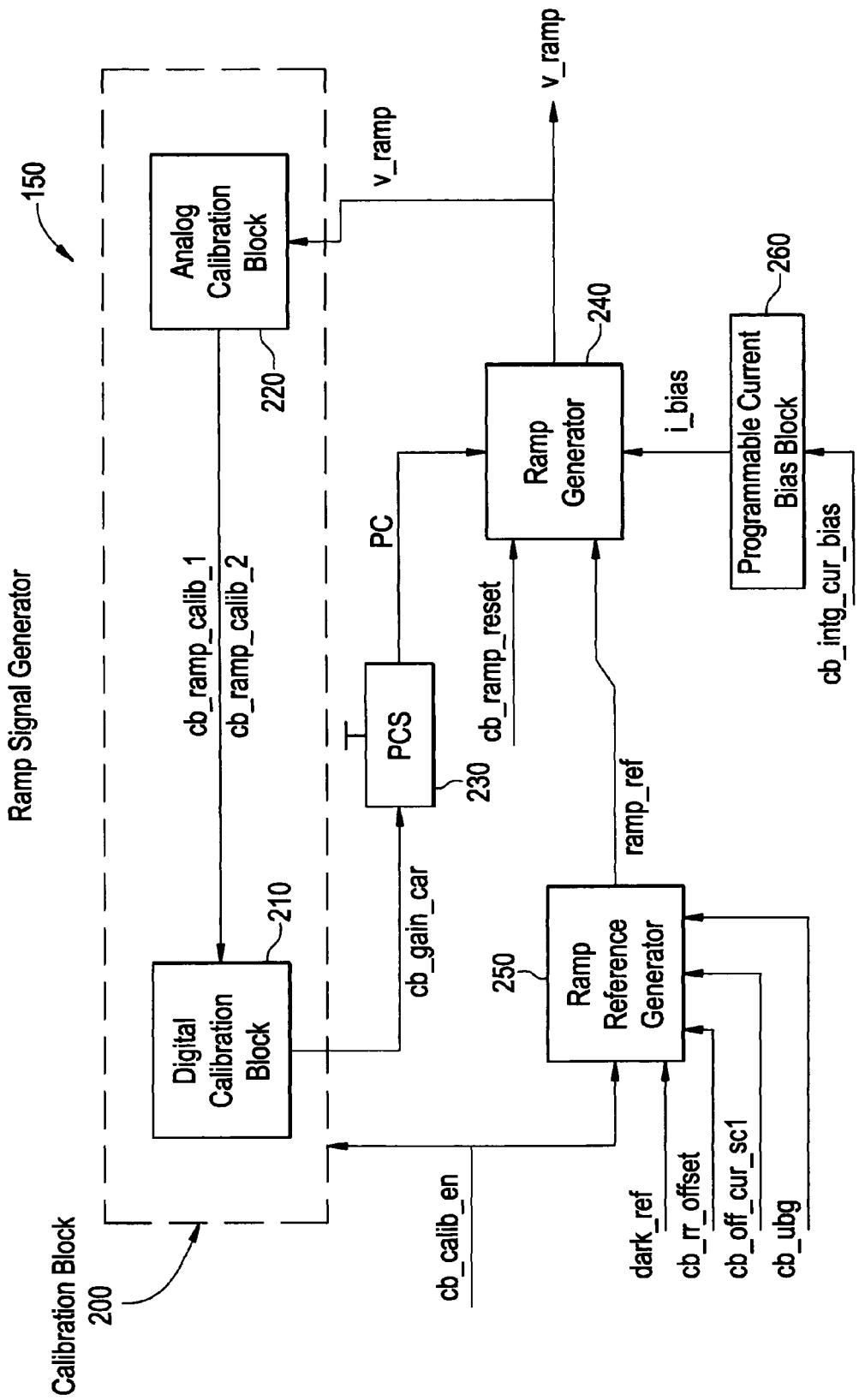
FIG. 2 is a block diagram of a ramp signal generator according to example embodiments.

FIG. 2 is a block diagram of the ramp signal generator 150 according to example embodiments.

Referring to FIG. 2, the ramp signal generator 150 may include a calibration block 200, a programmable current source (PCS) 230, a ramp generator 240, a ramp reference generator 250, and a programmable current bias block 260. The ramp signal generator 150 may also include a current mirror (not shown) to generate the required bias and reference currents for the components of the ramp signal generator 150. Also, the ramp signal generator 150 may be configured to receive a digital supply voltage and an analog supply voltage (not shown) to drive the ramp signal generator 150.

The ramp reference generator 250 may generate a ramp reference voltage ramp_ref based on a calibration enable signal cb_calib_en, a ramp reference offset signal cb_rr_offset, a ramp reference offset enable signal cb_off cur_sel, a ramp reference bypass signal cb_rr_byp, a bandgap voltage reference signal cb_vgb, and a dark reference voltage dark_ref. The ramp reference generator 250 may output the ramp reference voltage ramp_ref to the ramp generator 240.

In one example, the ramp reference generator 250 may operate in a normal or a bypass mode in response to the ramp reference bypass signal cb_rr_byp. If the ramp reference bypass signal cb_rr_byp is a first value (e.g., a logic high state "1"), the ramp reference generator 250 may operate in the bypass mode. The ramp reference generator 250 may operate in bypass mode during calibration of the ramp slope value of the ramp signal v_ramp. If the ramp reference bypass signal cb_rr_byp is a second value (e.g., a logic low state "0"), the ramp reference generator 250 may operate in the normal mode.

When the ramp reference generator 250 is in the bypass mode, the ramp reference generator 250 may generate a ramp reference voltage ramp_ref based on the bandgap voltage reference signal cb_vgb. The bandgap voltage reference signal cb_vgb may be indicative of an external band gap reference voltage.

Still referring to FIG. 2, in the normal mode, the ramp reference generator 250 may generate the ramp reference voltage ramp_ref based on shorting of source followers of dummy pixels, which are supposed to operate in the reset mode to generate the dark voltage. For example, the dark voltage is generated based on the dark reference voltage dark_ref, which may be a voltage based on replica (e.g., dummy) pixels. For example, the ramp reference voltage ramp_ref may be generated as the dark reference voltage dark_ref plus (or minus) an offset voltage based on other inputs (not shown). Tunable offsets can also be applied in order to assure reliable operation, and may also be cancelled in order to improve noise performance. This tunable offset can be applied in both directions (up and down).

The ramp reference generator 250 may output the generated ramp reference signal ramp_ref to the ramp generator 240.

The ramp generator 240 may generate the ramp signal v_ramp based on a programmable current PC, a ramp reset signal cb_ramp_reset, the ramp reference voltage ramp_ref, and a programmable current bias i_bias. The ramp generator 240 may output the ramp signal v_ramp to the ADC 140 of FIG. 1 and the calibration block 200.

Figure 3:
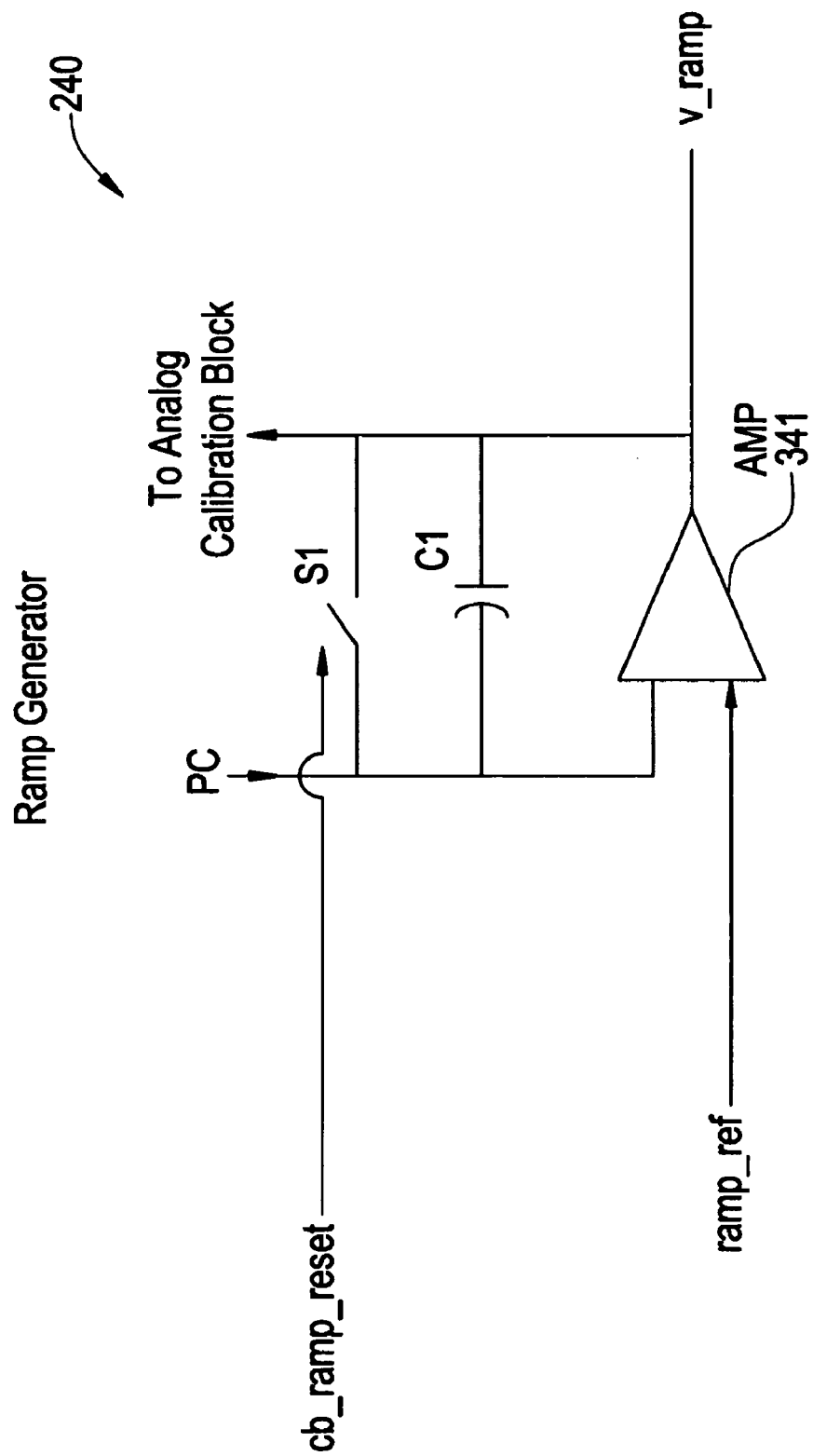
FIG. 3 is a block diagram illustrating a ramp generator according to example embodiments.
Figure 4:
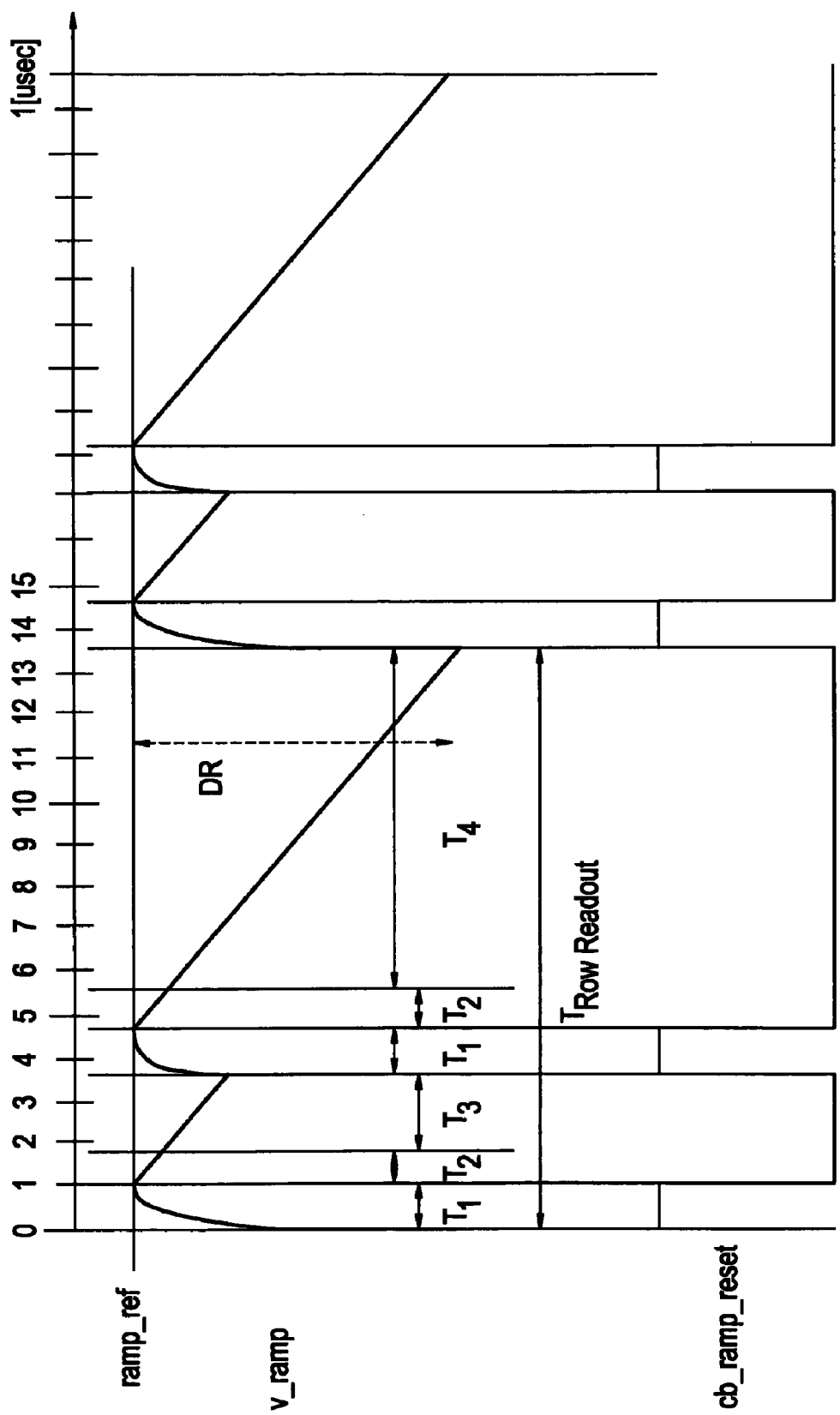
FIG. 4 is a graph illustrating a ramp signal generated by the ramp generator during a row readout according to example embodiments.

FIG. 3 is a block diagram of the ramp generator 240 of FIG. 2 according to example embodiments. FIG. 4 is a graph illustrating the ramp signal v_ramp generated by the ramp generator 240 during a row readout $T_{row\ readout}$ during normal mode according to example embodiments. For instance, FIG. 4 illustrates the ramp signal v_ramp corresponding to a digital CDS, where the ramp signal v_ramp is depicted as having two slopes per row readout. Example embodiments demonstrate below that one slope is sufficient for calibration. Although the example embodiments of FIG. 3 and FIG. 4 demonstrate an integrating type ramp generator, example embodiments are not limited thereto. For example, switch cap type ramp generators may be within example embodiments of the present application.

Referring to FIGS. 3 and 4, a switch S1 and a capacitor C1 may be connected in parallel between a first input and the output of an amplifier (AMP) 341. In example operation, the switch S1 may open or close in response to the ramp reset signal cb_ramp_reset. The AMP 341 may receive the programmable current PC at the first input and the ramp reference voltage ramp_ref at the second input.

In one example, if the ramp reset signal cb_ramp_reset is the first value, the switch Si may close and the ramp signal v_ramp may be pulled up to the ramp reference voltage ramp_ref. In FIG. 4, when the ramp reset signal cb_ramp_reset transitions from the first value to the second value, the switch S 1 may open and the ramp signal v_ramp may linearly decrease. DR indicates the ADC dynamic range value. The slope value of the ramp signal v_ramp may be linearly adjusted by the slope control signal cb_gain_car according to the calibration process described below.

Returning to FIG. 2, the programmable current bias block 260 may provide current biasing functions to the ramp generator 240 based on a programmable integrator bias current signal cb_intg_cur_bias. The nominal value of the programmable current bias i_bias may be approximately 5 µA and a least significant bit ("LSB") step may be approximately 125 nA.

The PCS 230 may generate the programmable current PC based on a slope control signal cb_gain_car received from the calibration block 200. The programmable current PC may define the ramp slope value for the ramp signal v_ramp. The nominal value of the programmable current PC may be approximately 1 μA and a least significant bit ("LSB") step may be approximately 125 nA.

The calibration block 200 may generate the slope control cb_gain_car in response to the calibration enable signal cb_calib_en. The slope control signal cb_gain_car may be a digital code for adjusting the ramp slope value of the ramp signal. The slope control signal cb_gain_car may be generated based on the ramp signal v_ramp from the ramp generator 240.

In one example, if the calibration signal is the first value, the ramp slope value of the ramp signal v_ramp may be calibrated using the calibration block 200. Thereafter, the calibration block 200 may output the slope control signal representing the calibrated ramp slope value of the ramp signal v_ramp.

The calibration block 200 may include an analog calibration block 220 and a digital calibration block 210. The analog calibration block 220 may receive the ramp signal v_ramp and output a first calibration code cb_ramp_calib_1 and a second calibration code cb_ramp_calib_2 to the digital calibration block 210. The digital calibration block 210 may generate the slope control signal cb_gain_car based on the first calibration code cb_ramp_calib_1 and second calibration code cb_ramp_calib_2. The digital calibration block 210 and the analog calibration block 220 will be described in more detail below.

Figure 5:
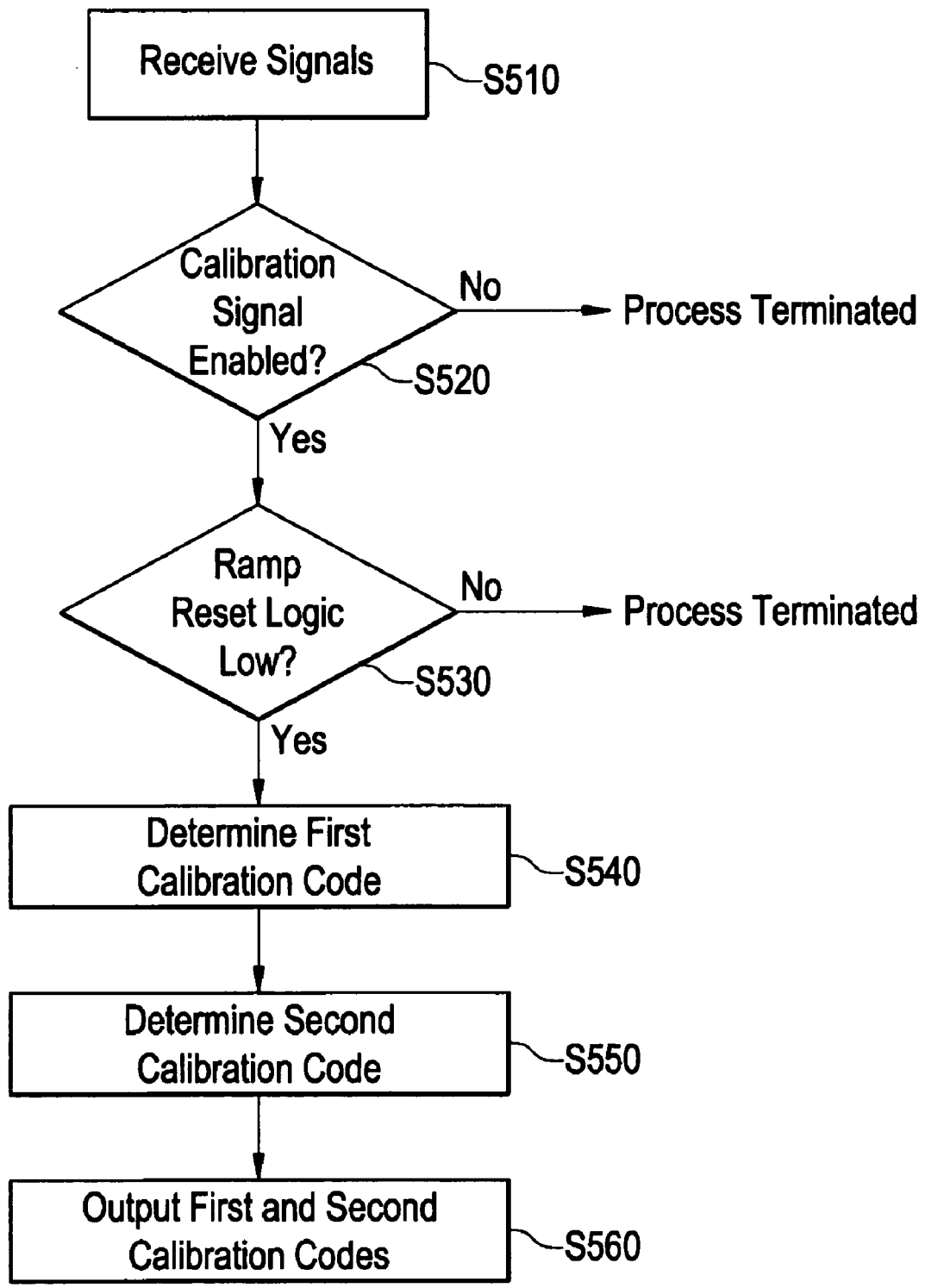
FIG. 5 is a flow diagram illustrating a method performed by an analog calibration block according to example embodiments.
Figure 6:
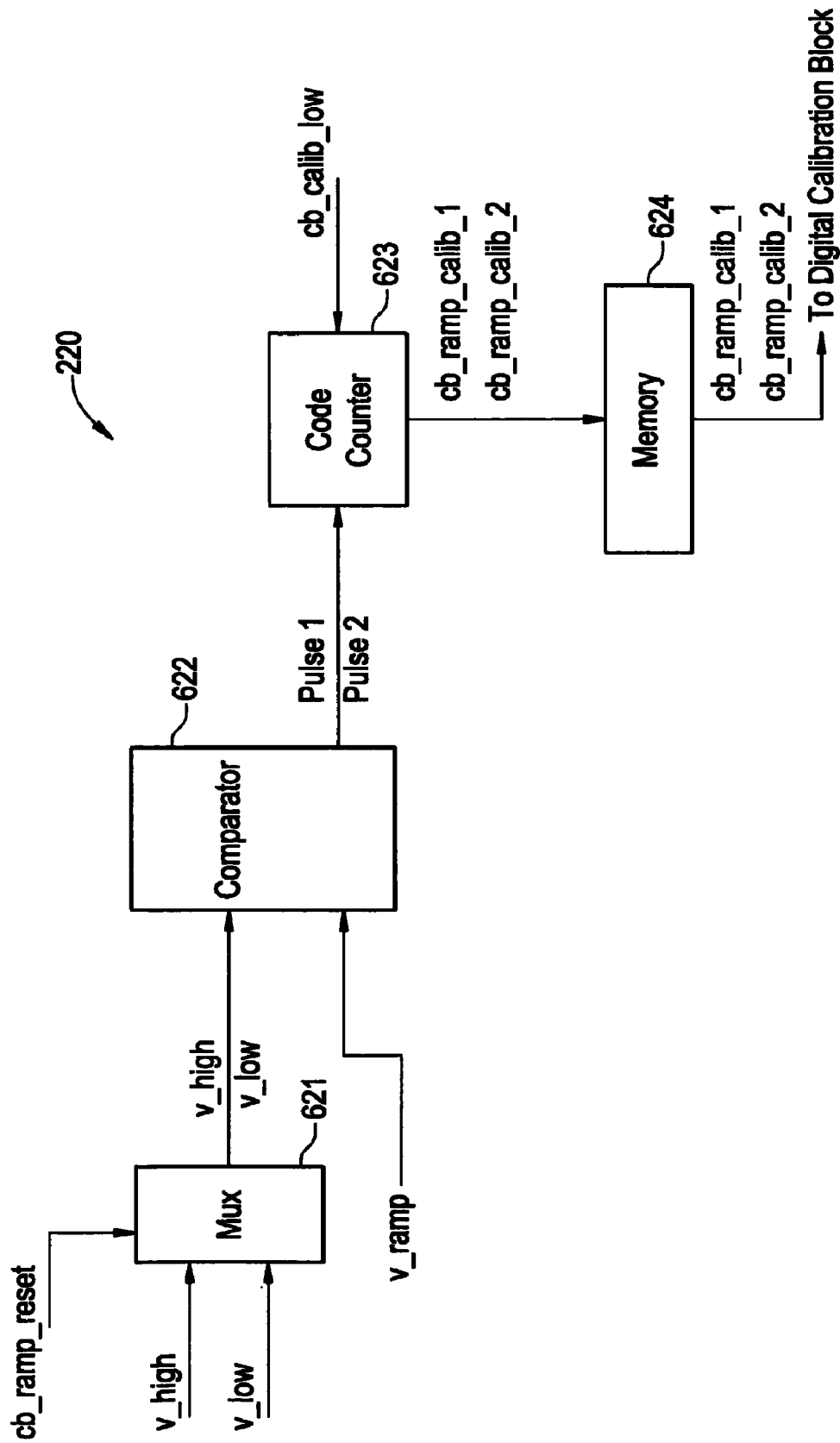
FIG. 6 is a block diagram illustrating an analog calibration block according to example embodiments.
Figure 7:
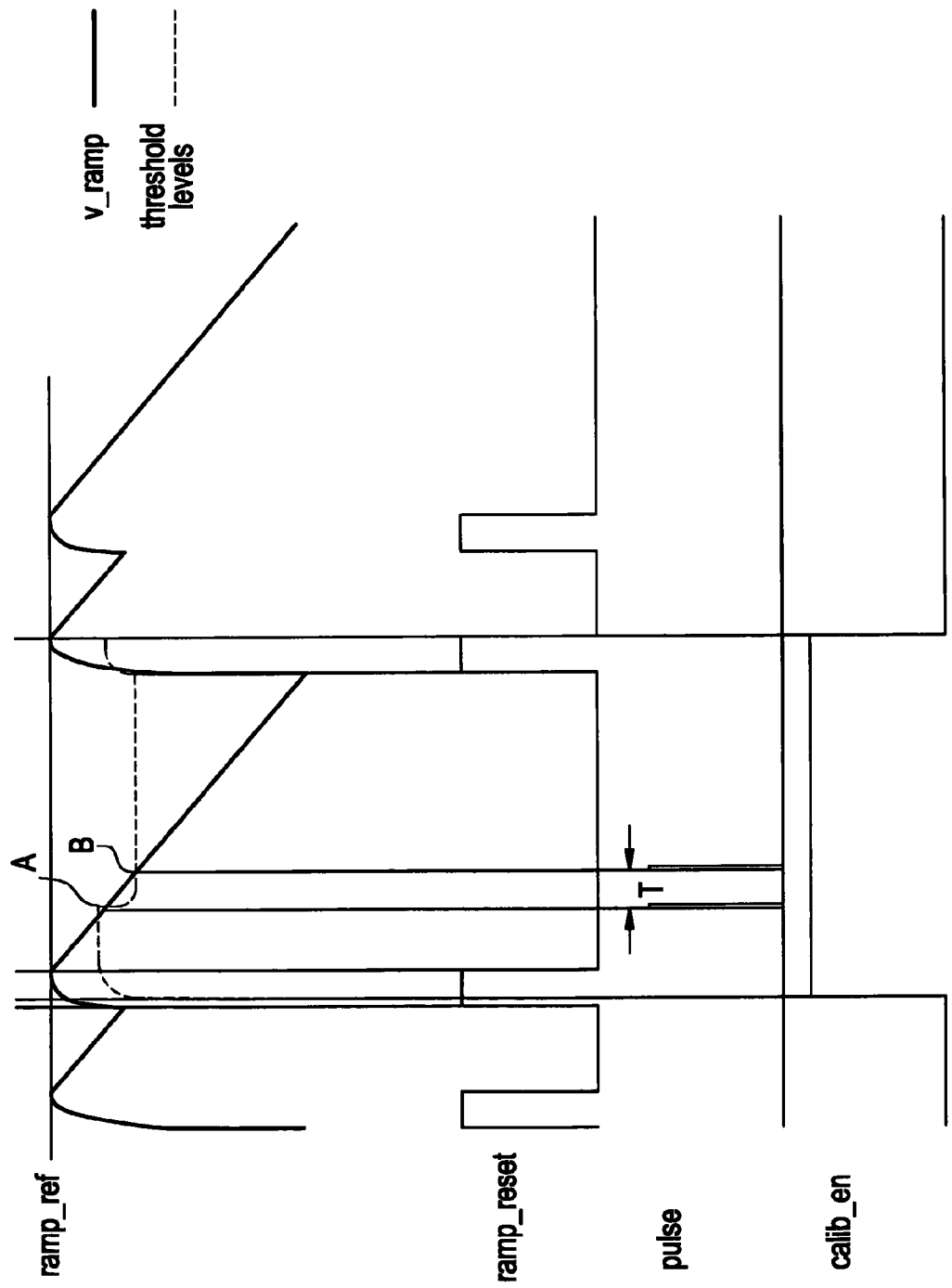
FIG. 7 is a graph illustrating waveforms generated by an analog calibration block according to example embodiments.

FIG. 5 is a flow diagram illustrating a method performed by the analog calibration block 220 according to example embodiments. FIG. 6 is a block diagram illustrating an analog calibration block according to example embodiments. As shown, the analog calibration block 220 may include a multiplexer (MUX) 621, a comparator 622, a code counter 623, and a memory 624. FIG. 7 is a graph illustrating example waveforms generated by the analog calibration block 220 of FIG. 2 according to example embodiments. An example embodiment of the analog calibration block 220 will be described with regard to FIGS. 5-7.

Referring to FIGS. 5 and 6, at S510, the analog calibration block 220 may receive the ramp signal v_ramp and the calibration enable signal cb_calib_en. At S520, the analog calibration block 220 may determine if the ramp signal generator 150 is in a calibration mode. The analog calibration block 220 may determine whether the ramp signal generator 150 is in the calibration mode based on the calibration enable signal cb_calib_en. For example, if the calibration enable signal cb_calib_en is a first value (logic high "1"), the analog calibration block 220 determines that the ramp signal generator 150 is in the calibration mode. If the calibration enable signal cb_calib_en is a second value (logic low "0"), the analog calibration block 220 is not in the calibration mode. If the ramp signal generator 150 is operating in the normal mode, not in the calibration mode, the process may terminate.

Returning to S520, if the ramp signal generator 150 is in the calibration mode, the analog calibration block 220 may check if the ramp reset signal cb_ramp_reset is set to the second value at S530. If the ramp reset signal cb_ramp_reset is the first value, the process may terminate.

Returning to S530, if the ramp reset signal cb_ramp_reset is the second value, the analog calibration block 220 may generate the first calibration code cb_ramp_calib_1 at S540. For example, referring to FIGS. 6 and 7, the MUX 621 may select a high threshold voltage v_high based on the second value of the ramp reset signal cb_ramp_reset. It is noted that an operational amplifier may be used instead of the MUX 621 according to example embodiments.

The comparator 622 may compare the high threshold voltage v_high output from the MUX 621 with the ramp signal v_ramp received from the ramp generator 240. The comparator 622 may generate a first pulse PULSE1 when the ramp signal v_ramp and the high threshold voltage v_high match. Referring to FIG. 7, reference point A indicates an example of when the high threshold voltage v_high and the ramp signal v_ramp match. As mentioned before, the embodiment illustrated in FIG. 7 can also be used in analog CDS. In Digital CDS (DCDS) first comparison (event A) can also be done during the first short slope. This alternative can simplify the system while sacrificing accuracy. Accuracy degradation appears due to possible difference between starting levels of short and long ramps. It is noted that the example embodiments illustrated in FIG. 7 may also be used within analog CDS.

Referring to FIG. 6, the code counter 623 may receive the first pulse PULSE1 generated by the comparator 622 and may output the first calibration code cb_ramp_calib_1 corresponding to a count value of the code counter 623 when the first PULSE1 is received. The code counter 623 may begin this count in response to the second value of the ramp reset signal cb_ramp_reset. Also, the code counter 623 may be a gray code counter or any other type counter, for example.

The memory 624 may receive and store the first calibration code cb_ramp_calib_1 in response to a recording signal cb_calib_low received at the code counter 623. The memory may be a static Random Access Memory (SRAM) or any other type of memory within example embodiments of the present application. For example, the recording signal cb_calib_low may indicate the corresponding memory cell within the memory 624 to record the first calibration code cb_ramp_calib_1 or the second calibration code_cb_ramp_calib_2.

Referring back to FIG. 5, at S550, the analog calibration block 220 may determine the second calibration code cb_ramp_calib_2.

Referring again to FIGS. 5-7, at reference point B, the MUX 621 may select a low threshold voltage v_low in the same manner as described above with regard to high threshold voltage v_high. The low threshold voltage v_low may be output to the comparator 622. The comparator 622 may compare the low threshold voltage v_low with the ramp signal v_ramp. The comparator 622 may generate a second pulse PULSE2 based on the comparison. For example, the comparator 622 may generate a second pulse PULSE2 when the low threshold voltage v_low and the ramp signal v_ramp match. Referring to FIG. 7, reference point B is an example of when the low threshold voltage v_low and the ramp signal v_ramp match.

The code counter 623 receives the second pulse PULSE2 from the comparator 622, and may output the second calibration code cb_ramp_calib_2 corresponding to the count value of the code counter 623 when the second PULSE2 is received. The memory 624 may receive and store the second calibration code cb_ramp_calib_2 response to the recording signal cb_calib_low received at the code counter 623.

According to example embodiments, the analog calibration block 220 may utilize single slope architecture. For example, the first calibration code cb_ramp_calib_1 and the second calibration code cb_ramp_calib_2 may be generated by the same signal path (e.g., a single MUX 621 and comparator 622). Furthermore, the ramp reference voltage ramp_ref, the high threshold voltage v_high, and the low threshold voltage v_low may be generated with reference to an external bandgap voltage to minimize process-voltage-temperature (PVT) variations.

In at least some example embodiments, calibration failure may occur if the second pulse PULSE2 is not generated. For example, the low threshold voltage v_low may not match the ramp signal v_ramp because the slope of the ramp signal v_ramp may be too low and the components of the ramp signal generator 150 may contain offsets and mismatches. This scenario may be avoided by selecting the appropriate threshold levels with an adequate margin. For example, the ramp reference voltage ramp_ref may be approximately 2.145V, the high threshold voltage v_high may be approximately 1.877V, and the low threshold voltage v_low may be approximately 1.766V. These voltage values may be determined by taking into account appropriate component offsets and tolerances.

Figure 8:
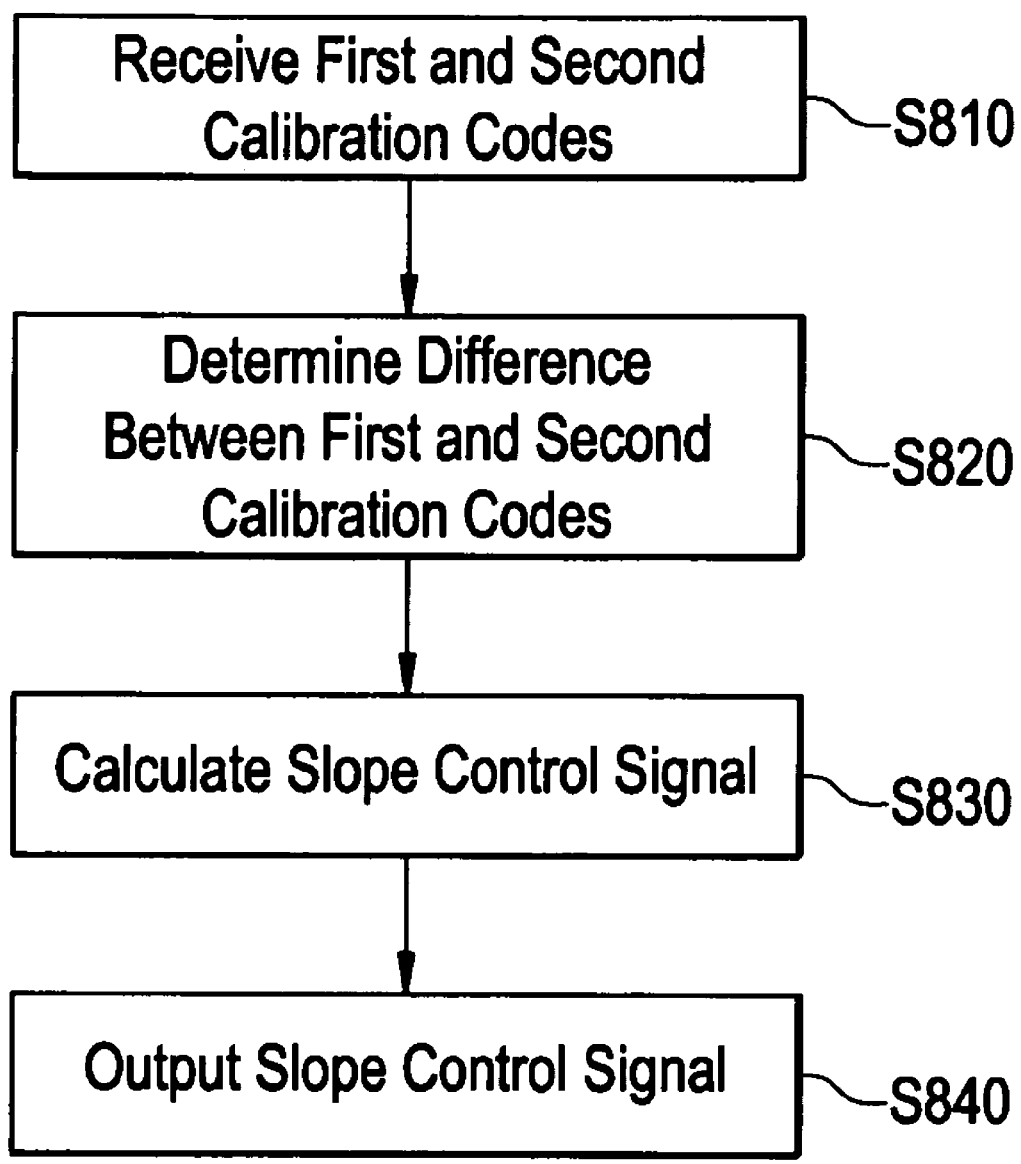
FIG. 8 is a flow chart diagram of a method performed by a digital calibration block according to example embodiments.

FIG. 8 is a flow chart diagram of a method performed by the digital calibration block 210 according to example embodiments.

Referring to FIG. 8, at S810 the digital calibration block 210 may receive the first calibration code cb_ramp_calib_1 and the second calibration code cb_ramp_calib_2 from the analog calibration block 220. At S820, the digital calibration block 210 may calculate a difference between the first calibration code cb_ramp_calib_1 and the second calibration code cb_ramp_calib_2. To calculate the difference between the first calibration code cb_ramp_calib_1 and the second calibration code cb_ramp_calib_2, the calibration codes may be converted from gray to binary code. The difference between the first calibration code cb_ramp_calib_1 and the second calibration code cb_ramp_calib_2 are referred to hereinafter as $T_{count}$.

At S830, the digital calibration block 220 may calculate the slope control signal based on the calculated difference $T_{count}$ and a gain factor GF using a calibration algorithm. In one example, the calibration algorithm may include the following equation.

$$GF=(GF_{nom}*T_{count})/(T_{count\_nom}*CNC)$$

In the above-equation, the Gain Factor GF represents the slope control signal cb_gain_car provided to the PCS 230 of FIG. 2. The constant normalization coefficient CNC represents the ratio between the currently programmable current PC used during calibration and the nominal current represented by the gain factor GF. The CNC's default value is 1 assuming the nominal current value was used during calibration. $GF_{nom}$ is the default gain factor or the previously measured GF value. $T_{count\_nom}$ is the default value or the previously determined difference between the first and second calibration codes. The $T_{count\_nom}$ may be assigned a default value provided at start up, or a measured value determined during chip evaluation. The gain factor GF and the $T_{count\ value}$ may be utilized as the $GF_{nom}$ and the $T_{count\_nom}$ for the next calibration cycle.

Returning to FIG. 8, at S840 the digital calibration block 220 may output the slope control signal cb_gain_car to the PCS 230. As discussed above with regard to FIG. 2, the PCS 230 may adjust the programmable current PC based on the calculated slope control signal cb_gain_car, and the programmable current PC may be provided to the ramp generator 240 to generate the calibrated ramp signal v_ramp.

As a result, the slope value of the ramp signal used within CMOS image sensors may be more accurately calibrated; thereby the accuracy of the slope of the ramp signal may be increased. As demonstrated by the example embodiments, the ramp generator and method thereof may compensate for process variations, mismatches, and operating conditions such as temperature, supply voltage and clock frequency, for example. The time required to start-up a camera or any other similar device may be decreased, while increases to the area and power consumption may remain negligible.

Although example embodiments have been described with regard to "blocks" such as a calibration block, etc. these may also be referred to as "units" or "circuits."

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An image sensor comprising:
an active pixel sensor (APS) array configured to generate a reset signal and an image signal for a pixel of a selected column of the APS array;
a calibration unit configured to generate a slope control signal for adjusting a ramp slope value;
a ramp signal generator configured to generate a ramp signal based on the slope control signal, the ramp slope value of the ramp signal being adjusted based on the slope control signal; and
an analog-to-digital converter (ADC) configured to generate a digital code based on the ramp signal and a difference between the reset signal and the image signal, the calibration unit including,
an analog calibration unit configured to generate a first calibration code based on the ramp signal and a first threshold voltage and generate a second calibration code based on the ramp signal and a second threshold voltage; and
a digital calibration unit configured to receive the first calibration code and the second calibration code from the analog calibration unit and generate the slope control signal based on the received first and second calibration codes.

2. The image sensor of claim 1, wherein the calibration unit is configured to generate the slope control signal in response to a calibration enable signal, the slope control signal being a digital code.

3. The image sensor of claim 1, wherein the analog calibration unit generates the first calibration code by comparing the ramp signal with the first threshold voltage, and generates the second calibration code by comparing the ramp signal with the second threshold voltage.

4. The image sensor of claim 1, wherein the digital calibration unit generates the slope control signal based on the first and second calibration codes and a slope control signal for a previous calibration cycle.

5. The image sensor of claim 4, wherein the digital calibration unit generates the slope control signal based on a difference between the first calibration code and the second calibration code.

6. The image sensor of claim 5, wherein the digital calibration unit generates the slope control signal according to the following equation:

$$GF=(GF_{nom}*T_{count})/(T_{count\_nom}*CNC)$$

where, GF represents the slope control signal, $GF_{nom}$, represents the slope control signal for a previous calibration cycle, $T_{count}$ represents the difference between the first calibration code and the second calibration code, $T_{count\_nom}$ represents a different between the first and second calibration code for the previous calibration cycle, and CNC represents a constant normalization coefficient.

7. The image sensor of claim 6, wherein the slope control signal for the previous calibration cycle, the constant normalization coefficient, and the difference between the first calibration code and the second calibration code for the previous calibration cycle are default values.

8. The image sensor of claim 1, wherein the analog calibration unit includes,
a multiplexer configured to generate the first threshold voltage and the second threshold voltage based on a ramp reset signal,
a comparator configured to compare either the first or second threshold voltage and the ramp signal, and configured to generate a first pulse signal when the first threshold voltage matches the ramp signal and a second pulse signal when the second threshold voltage matches the ramp signal, and
a code counter configured to generate a first and second calibration code signal in response to the first and second pulse, respectively.

9. The image sensor of claim 1, wherein the analog calibration unit includes a memory configured to store the first and second calibration codes in response to a recording signal and output the first and second calibration codes to the digital calibration unit.

10. The image sensor of claim 1, wherein the ramp signal generator further includes,
a programmable current source (PCS) configured to adjust a programmable current based on the slope control signal received from the digital calibration unit, the programmable current defining the ramp slope value of the ramp signal,
a ramp reference generator configured to generate a ramp reference voltage, and
a ramp generator configured to generate the ramp signal based on the programmable current, the ramp reference voltage, and a programmable current bias.

11. The image sensor of claim 10, wherein the ramp reference generator operates in a normal mode or a bypass mode in response to a ramp reference bypass signal.

12. The image sensor of claim 10, the image sensor further comprising:
a programmable current bias unit configured to generate the programmable current bias provided to the ramp generator based on a programmable integrator bias current signal.

13. The image sensor of claim 10, wherein the ramp generator further includes,
a switch configured to open and close in response to the ramp reset signal,
a capacitor connected in parallel with the switch,
a second operational amplifier configured to generate the ramp signal based on the programmable current and the ramp reference voltage.

14. A method for calibrating a ramp slope value of a ramp signal by an image sensor, the method comprising:
first generating, by the image sensor, a reset signal and an image signal for a pixel of a selected column of an array;
second generating, by the image sensor, a slope control signal for adjusting the ramp slope value;
third generating, by the image sensor, the ramp signal based on the slope control signal, the ramp slope value of the ramp signal being adjusted based on the slope control signal; and
fourth generating, by the image sensor, a digital code based on the ramp signal and a difference between the reset signal and the image signal,
wherein the second generating step includes,
generating a first calibration code based on the ramp signal and a first threshold voltage and a second calibration code based on the ramp signal and a second threshold voltage;
generating the slope control signal based on the first and second calibration codes.

15. The method of claim 14, further comprising:
adjusting a programmable current based on the generated slope control signal, the programmable current defining the ramp slope value of the ramp signal.

16. The method of claim 14, wherein the second generating step includes calculating a difference between the first and second calibration codes.

17. The method of claim 14, wherein the second generating step includes generating the slope control signal according to the following equation:

$$GF=(GF_{nom}*T_{count})/(T_{count\_nom}*CNC)$$

where, GF represents the slope control signal, $GF_{nom}$ represents a slope control signal for a previous calibration cycle, $T_{count}$ represents the difference between the first calibration code and the second calibration code, $T_{count\_nom}$ represents a different between the first and second calibration code for the previous calibration cycle, and CNC represents a constant normalization coefficient.

18. The method of claim 17, wherein the slope control signal for the previous calibration cycle, the constant normalization coefficient, and the difference between the first calibration code and the second calibration code for the previous calibration cycle are default values.

19. A method for calibrating a ramp slope value of a ramp signal, the method comprising:
generating a first ramp signal corresponding to a first calibration cycle;
generating a first and second calibration code based on the first ramp signal;
generating a slope control signal based on the first and second calibration codes; and
calibrating a ramp slope value of a second ramp signal corresponding to a second calibration cycle based on the slope control signal, wherein the slope control signal is generated according to the following equation, $$GF=(GF_{nom}*T_{count})/(T_{count\_nom}*CNC)$$

where, GF represents the slope control signal, $GF_{nom}$ represents a slope control signal for a previous calibration cycle, $T_{count}$ represents the difference between the first calibration code and the second calibration code, $T_{count\_nom}$ represents a different between the first and second calibration code for the previous calibration cycle, and CNC represents a constant normalization coefficient.

20. The method of claim 19, wherein the slope control signal for a previous calibration cycle, the constant normalization coefficient, and the difference between a first calibration code and a second calibration code for the previous calibration cycle are default values.

* * * * *